United States Patent [19]
Artwick

[11] Patent Number: 5,651,676
[45] Date of Patent: Jul. 29, 1997

[54] METHOD OF ORGANIZING AND STORING SIMULATED SCENERY IN A FLIGHT SIMULATION SYSTEM

[75] Inventor: Bruce Arthur Artwick, Champaign, Ill.

[73] Assignee: Microsoft Corporation, Redmond, Wash.

[21] Appl. No.: 116,155

[22] Filed: Sep. 2, 1993

[51] Int. Cl.$^6$ .............................. G09B 9/08; G09B 19/16
[52] U.S. Cl. ........................ 434/43; 434/38; 434/307 R; 395/127
[58] Field of Search .................... 434/12, 29, 30, 434/33, 34, 37, 38, 43, 118, 130, 150, 153, 307 R, 365; 364/578; 395/118, 119, 128–131

[56] References Cited

U.S. PATENT DOCUMENTS

| | | | |
|---|---|---|---|
| 4,343,037 | 8/1982 | Bolton | 434/43 X |
| 4,645,459 | 2/1987 | Graf et al. | 434/43 |
| 4,714,428 | 12/1987 | Bunker et al. | 434/43 |
| 4,873,585 | 10/1989 | Blanton et al. | 395/127 X |
| 5,319,793 | 6/1994 | Hancock et al. | 395/125 X |
| 5,338,200 | 8/1994 | Olive | 434/43 |

*Primary Examiner*—Joe Cheng
*Attorney, Agent, or Firm*—David M. Klein; Bryan Cave LLP

[57] ABSTRACT

The present invention is an improved flight simulation system. The system organizes data based upon a predetermined number of object types. Each scenery file is divided to separate the data for each object type. Object data is sub-divided into latitude bands of a fixed range of latitude. The system selectively analyzes the latitude band data to locate objects to be processed. For each object type, the objects within a latitude band are sorted and analyzed from west to east. The present system also includes a seeded scenery system. Various levels of seeds, each seed size referring to the size of the area covered by each seed are used. The seeded scenery system provides background scenery only when no other scenery is available to overwrite it. The system also includes a dynamic overlay management system which, when it loads a routine into memory, rewrites the line of code which called the routine to be a call directly to the location of the routine which is now in memory.

32 Claims, 9 Drawing Sheets

METHOD OF ORGANIZING AND STORING SIMULATED SCENERY IN A FLIGHT SIMULATION SYSTEM

BACKGROUND OF THE INVENTION

1. Field of the Invention

The present invention relates generally to flight simulation systems, and more particularly to a flight simulation system incorporating an improved scenery database design, an improved overlay management system, and seeded scenery providing for enhanced performance.

2. Description of the Prior Art

Flight simulation systems are well known for both recreational purposes, such as applicants' previously developed MICROSOFT FLIGHT SIMULATOR version 4.0, and for non-recreational purposes, such as military applications and flight training. In such prior art systems, scenery was organized into blocks of data. When flying in the direction of a particular block, it would be loaded in to system memory while overwriting a block of scenery data that corresponds to scenery that was being flown away from. The effect of this is that whole scenery areas would pop up all at once in front of the aircraft. Transitions were very abrupt.

While such abrupt transitions and other deficiencies which exist in prior art flight simulation systems may be satisfactory under certain conditions, they detract from the processing efficiency of such systems and are undesirable. For example, this results in slow systems, wherein the display lags behind the actual motion of the aircraft and reduces the reality of the simulation. It is therefore an object of the present invention to improve the efficiency of such flight simulations systems, and to provide a novel method of organizing and accessing the scenery data to provide improved flight simulation.

SUMMARY OF THE INVENTION

The present invention is an improved flight simulation system, FLIGHT SIMULATOR version 5.0, which operates on an IBM compatible computer. The system simulates the operation of an aircraft as the aircraft traverses scenery, such as the ground, airborne objects, and environmental conditions. Within the program or software for the flight simulation system is a menu which allows the user to select a scenery area. This mechanism selects a file which contains a list of numbers which are referred to as World Set Numbers. These numbers are references to what subset of the currently available scenery files are a part of the selected scenery database system. Each of the scenery files contains a reference to this number at the very beginning of the file. The directory containing the scenery files is searched and all files which are a member of the list of World Set Numbers in the selected scenery area are located. A small header section from each of these files is then loaded into memory. Therefore by selecting a scenery area from within the program the user is selecting a subset of the available scenery files which collectively are referred to as a scenery database system. Each World Set Number is stored as a 16 bit unsigned integer.

The header data is used in different ways depending on which system is using it. In order to represent such a world in as much detail as possible, an enormous amount of data may be required. The present system organizes data on an object level, based upon a predetermined number of object types. What constitutes an object is preferably determined by the scenery designer when the scenery is designed.

Usually, an object is something that is logically thought of as an entity, such as building or runway. Objects may have features which may be displayed only when viewed from a close enough range. This is accomplished by having two different radiuses, a radius and a far radius. The system determines which data extract and display depending on the range from the object.

If the world is geographically large, or has a high object density, the world is divided into separate files. All scenery files preferably include a header which includes the geographic location of the file and addresses which specify where in the file to look for the scenery in the file. Using the airplane as the center, only scenery files within 70 km of the aircraft are considered. Once a particular world is selected, the system identifies those scenery files which are in the list of world set numbers of the selected world. The header from each of these files is loaded into system memory.

Each scenery file is divided to separate the data for each object type. The location of the data for each object type is stored in a look-up table in the system memory. For each object type, the data is sub-divided into latitude bands (lat bands) of a fixed range of latitude. In flight, for each file within view of the aircraft, the system analyzes the southernmost lat band, and determines its distance from the aircraft. If that band is not within range, the next northern band is analyzed until a band is reached which is within view of the aircraft. Only for lat bands that are within view of the aircraft are the objects in that lat band analyzed for purposes of simulation or display.

For each object type, the objects within a lat band are preferably sorted from west to east. For each lat band which is within view, the system preferably analyzes the objects from west to east until an object is determined to be within view. Once an object is within view it is processed as appropriate for that object type. The easterly objects are processed until an object is determined to be out of range to the east.

Numerous object types are available in FLIGHT SIMULATOR including VOR Radio Data, Automatic Direction Finder Data, Synthesized Scenery Seeds, Object Data, Airport Facilities Data, Library Data, Anchor Point Data, Communication Radio Data, Dynamic Object Paths, Miscellaneous Data, Title Data, Magnetic Variation Data, and Exceptions Data.

The present system includes a seeded scenery system which represents the surface of the earth using various surface types. Each seeded data point grows into an appropriate visual image. There are preferably eight levels of seed, each of which is an object type. The level of a seed is a reference to the size or resolution of the area covered by each seed. The seeded scenery system complements other scenery systems and is usually displayed as background scenery only when no other scenery information is available. Higher level seeds will overwrite lower level seeds if they both cover the same area. Other scenery objects will also be displayed because they are always drawn after the seeds are, thus overwriting what would have been displayed by the seeded scenery system.

The present system also includes a dynamic overlay management system to handle memory management. When the overlay manager is called, and loads a routine into memory, the line of code which called the routine is rewritten to be a call directly to the location of the routine which is now in memory. The code is rewritten to its previous form once the overlay manager unloads the routine from memory.

BRIEF DESCRIPTION OF THE DRAWINGS

FIGS. 1 A–D is a block diagram showing the processing of VOR type objects in the flight simulator of the present invention.

DESCRIPTION OF THE PREFERRED EMBODIMENT

The present invention is a flight simulation system with improved performance and more realistic simulation of actual flight conditions brought about through various improvements which each make the system more efficient by reducing the burden on the processor or display and is an improvement over our prior commercially available FLIGHT SIMULATOR sold by MICROSOFT. The present commercially available flight simulation system sold by MICROSOFT under the name FLIGHT SIMULATOR, is preferably operated on an IBM compatible computer using an INTEL 80×86 processor, with the software preferably being written in 8086 compatible assembler language, or on an APPLE computer in MOTOROLA 680xx assembler language. However, it is readily foreseen that the concepts disclosed herein for the improved performance of a flight simulation system may be applicable to other types of simulators, flight or otherwise.

A flight simulation system simulates the operation of one or more aircraft as the aircraft traverses scenery, which may include objects on the ground, airborne objects such as other aircraft, and environmental conditions. For any given flight, the scenery which is capable of being displayed is the "world." A user of the present flight simulation system flies through a world, and interacts with many objects during the flight. A world need not be the planet Earth, or a portion thereof, but may be any real or simulated combination of scenery, including terrain, objects on the surface of the terrain, environmental conditions, and airborne objects, etc., as desired. It should be appreciated that a "world" may cover a large or small area, have a number of different types of terrain, airborne, and ground objects, and a variety of environmental conditions. In order to represent such a world in as much detail as possible, an enormous amount of data may be required. This data must be processed and displayed in as close to real-time as possible to make the simulation appear realistic. Retrieving, processing, and displaying this data, during flight requires great efficiency in the flight simulation system.

By the present invention, the database which contains the scenery for a world is organized so as to allow rapid access to the data objects which need to be processed and/or displayed during flight. During operation of the flight simulation system, a user is given an option to select a scenery area, i.e. to define the "world" through which the user wishes to fly. This is preferably accomplished by means of pull-down menus.

The scenery area chosen by the user preferably has geographic boundaries which define the geographic boundaries of the ground surface over which the user will fly. The terrain data in the selected world may be from real-world data, or may be simulated. The terrain may include any type of object defined in the scenery database as discussed below.

If the world is geographically large, or has a high object density, it is preferred to divide the world into separate files, wherein each file contains a sub-portion of the world. This division is preferably geographically logical, namely, the contents of each file is based upon the geographical location of those file contents in the world.

Each world preferably has an associated world file which contains a list of world set numbers for that world. World set numbers are references to the subset of the currently available scenery files which are part of the selected world. Every scenery file, whether or not a part of the selected world, preferably contains a reference number at the very beginning of the file. When a particular world is selected, the directory containing the scenery files is searched, and all files whose reference number is in the list of world set numbers of the selected world are identified. By selecting a world from within the program, the user is actually selecting a subset of the available scenery files which, together, comprise that world.

The location of any object, including the airplane itself, is preferably determined from the latitude, longitude, and altitude of the object. In addition, pitch, bank, and heading are used to determine the orientation of the aircraft.

| | |
|---|---|
| 1) Latitude | in meters from equator with north taken as positive 32 bits signed integer and 16 bits of fractional component. |
| 2) Longitude | in 48 bit pseudo degrees are 0 at 0 degrees Longitude (Greenwich England), and divide the Earth into 2 to the 48th equal angles with increasing values going east from 0 degrees longitude. |
| 3) Altitude | in meters above mean sea level with 32 bits positive integer and 16 bits of fractional component. |
| 4) Pitch | in 32 bit pseudo degrees which divide a circle into 2 to the 32nd equal angles with 0 level to earth and positive sense with aircraft's nose downward |
| 5) Bank | in 32 bit pseudo degrees which divide a circle into 2 to the 32nd equal angles with 0 level to earth and positive sense with aircraft's left wing downward |
| 6) Heading | 32 bit pseudo degrees which divide a circle into 2 to the 32nd equal angles with 0 due north and positive sense the same as a compass. |

The following is a reproduction of the current aircraft position data format written in 8086 compatible assembler.

```
plane0time    dw  0,0,0  ;time iiii.ff iiii=18.196 ticks/sec
plane0lat     dw  0,0,0  ;iiii.ff Meters          0=equator
plane0lon     dw  0,0,0  ;48-bit pseudo degrees   0=greenwich
plane0alt     dw  0,0,0  ;iiii.ff Meters
plane0pitch   dw  0,0    ;32-bit pseudo degrees
plane0bank    dw  0,0    ;32-bit pseudo degrees
plane0heading dw  0,0    ;32-bit pseudo degrees
```

All scenery files preferably include four numbers near the beginning of the file, the north and south latitudes and the east and west longitudes of the geographic limits of the file contents. The geographic limits for any world are the combined geographic limits of the scenery files which make up that world. During flight, the boundaries of each file are used to determine if the current aircraft position is near enough to that file to bother considering its contents. Each file need not cover the same geographic area.

Using the airplane as the center, only scenery files (and objects in those files) within a predetermined distance from the aircraft, preferably 70 kilometers, are considered to be within the view (or range) of the aircraft. Thus, the system preferably only considers those files which have a geographic area which falls within this view distance. This enables the system of the present invention to only consider a subset, generally a very small subset, of the world at any given time and improves the system performance.

At the beginning of each scenery file is a 128 byte header which contains at least the following three types of data:

(1) The world set number of the data file
(2) The geographic range of the data in the file for a particular object type.
(3) Addresses which specify where in the file to look (the offset in bytes from the beginning of the file) to find a particular type of scenery item. If the address given is a zero then there is no data of the indicated type in the file.

The following is a reproduction of the header format written in 8086 compatible assembler.

| DATA SIZE | ADDRESS OF DATA | FILE Offset | DESCRIPTION |
|---|---|---|---|
| dw | 0001 | ;00 | world set number 0=off, 1=fs5 default world |
| dd | 000490000h | ;02 | North boundary of file contents, Meter Units |
| dd | 0003f0000h | ;06 | South boundary of file contents, Meter units |
| dd | 0cf000000h | ;10 | East boundary of file contents, 32-bit pseudo degrees |
| dd | 0bf000000h | ;14 | West boundary of file contents, 32-bit pseudo degrees |
| dd | VOR_DATA | ;18 | VOR RADIO DATA |
| dw | 50 | ;22 | lowest vor freq (channel 0–199) |
| dw | 50 | ;24 | highest vor freq (108.00–117.95) |
| dd | SYNTH_SEEDS_08 | ;26 | seeds level 8 |
| dd | SYNTH_SEEDS_09 | ;30 | seeds level 9 |
| dd | SYNTH_SEEDS_10 | ;34 | seeds level 10 |
| dd | SYNTH_SEEDS_11 | ;38 | seeds level 11 |
| dd | SYNTH_SEEDS_12 | ;42 | seeds level 12 |
| dd | SYNTH_SEEDS_13 | ;46 | seeds level 13 |
| dd | SYNTH_SEEDS_14 | ;50 | seeds level 14 |
| dd | SYNTH_SEEDS_15 | ;54 | seeds level 15 |
| dd | OBJECT_DATA | ;58 | OBJECT DATA |
| dd | LIBRARY_DATA | ;62 | LIBRARY DATA |
| dd | FACILITIES_DATA | ;00 | AIRPORT FACILITIES DATA |
| dd | ANCHOR_POINT_DATA | ;70 | ANCHOR POINT DATA |
| dd | COM_RADIO_DATA | ;74 | COMMUNICATION RADIO DATA |
| dd | ADF_DATA | ;78 | AUTOMATIC DIRECTION FINDER DATA |
| dd | DYN_OBJ_PATHS | ;82 | DYNAMIC OBJECT PATHS |
| dw | 0,0,0,0 | ;86 | Library id min. |
| dw | 0,0,0,0 | ;94 | Library Id max. |
| dd | MISC_DATA | ;102 | Miscellaneous data (E.G. ground altitude data) |
| dd | TITLE_DATA | ;106 | TITLE AND DESCRIPTION DATA |
| dd | MAGVAR_MAP | ;110 | |
| dd | EXCEPTIONS_DATA | ;114 | |
| dd | 0 | ;118 | reserved |
| dd | 0 | ;122 | reserved |
| dd | 0 | ;126 | reserved |
| dw | 0 | ;128 | end of header (128 bytes long) |

In operation, once a particular world is selected, the system scans the headers of all scenery files in the directory containing the scenery files, and identifies those scenery files which are in the list of world set numbers of the selected world. Once each of these files has been identified, the header from each file is loaded into system memory. In order to determine which scenery files are within range of the aircraft, the system need only scan the headers (which is done very quickly) to identify the scenery files of interest.

As shown in FIG. 7, each scenery file is preferably divided so that the data for each type of object is separated from the other types of objects. This is done by means of a look-up table which is contained in the file header and kept in the system memory. The look-up table contains an offset into the file for each object type to a location where the data for that object type is stored. For each object type, the data is sub-divided into latitude bands (lat bands) of a fixed range of latitude. For example, if a particular file covers a geographic range of 10° of latitude, that file might be broken into 10 latitude bands each covering 1° of latitude. For each object type, all objects in a file are preferably sorted into latitude bands with the southern most band first, and continuing northward, or vice versa. In operation, for each file within view of the aircraft, the system determines which object types are not empty. For each object type, the system then preferably analyzes the southernmost lat band, and determines its distance from the aircraft. If that band is not within range, the next northern band is analyzed until a band is reached which is within view of the aircraft. Only for lat bands that are within view of the aircraft are the objects in that lat band analyzed for purposes of simulation or display. As the remaining lat bands in a file are traversed to the north, once a lat band is determined to be out of range to the north, no more lat bands in that file for that object type need to be considered. It is readily foreseen that this procedure for traversing lat bands may be modified, such as by analyzing lat bands from the position of the aircraft southward until a lat and is encountered which is out of range, and then repeating this procedure for lat bands to the north of the aircraft. Other variations for scanning the lat bands for locating and processing the objects therein exist which are within the scope of this invention.

Lat bands are utilized in order to minimize the information which is considered by the flight simulator to that information which is within view of the aircraft. It is understood that "view" does not refer to the objects which may be physically seen from the aircraft, but is a parameter which is fixed so as to limit the number of objects which are processed at a given time to improve performance of the simulator. Since not all computers have the same amount of memory storage, there are instances in which the number of objects to be processed at a given time exceeds the buffer size for processing such objects. If FLIGHT SIMULATOR determines that the object buffer (a portion of system memory allocated to storing and processing the objects in view) is becoming full, the "view" distance may be reduced by the system in a gradual manner, in order to reduce the number of objects which are processed at a given time until the number of active objects will fit in the object buffer.

For each object type, the objects within a lat band are preferably sorted from west to east. For each lat band which is within view, the system preferably analyzes the objects from west to east until an object is determined to be within view. Once an object is within view it is processed as appropriate for that object type, as discussed below. The next easterly object in the lat band is then processed. Once an object is determined to be out of range to the east, no more objects further to the east in that lat band are considered for display. Thus, only those objects which are within view in latitude and longitude are actually processed by the system beyond an initial determination of the position of the object. In an alternative embodiment, objects are considered from the position of the aircraft westward until no further objects are in view to the west, then objects are considered to the east of the aircraft in a like manner. This embodiment eliminates consideration of all objects out of view of the aircraft, but requires more complex indexing of the object locations.

It is quite possible that the geographic regions of several different scenery files may be within the view of the aircraft at a given time. The procedure which has been described above for a scenery file wherein the lat bands of the file are scanned, and then the objects in the file are scanned, is preferably repeated for each file in view of the aircraft.

While the preferred organization of the scenery database system has now been described, the actual objects which comprise the scenery, will now be discussed. For purpose of organizing scenery data within files, the scenery is categorized as objects, each object being of a select object type, and each type of object is processed differently.

The following object types are preferably available in the improved version of FLIGHT SIMULATOR which is being described herein:

VOR Radio Data

A virtual instrument used for navigation. Used to tell the compass direction of an aircraft from a stationary transmitter. FLIGHT SIMULATOR preferably supports two of these instruments.

Automatic Direction Finder Data

A virtual instrument used for navigation. Used to tell the direction of a stationary transmitter from the aircraft.

Synthesized Scenery Seeds

The scenery data which defines the world preferably specifies the nature of the surface terrain. For example the surface terrain may be water, a mountain, a city, or etc. When flying over a given area in which there is no specific scenery data, the present system draws on this database and synthesizes an image of the surface which is appropriate to the corresponding surface type. The contents of the database are referred to as seeds because the scenery is stored in a reduced data format, and the system grows the data into scenery when it is to be displayed. Seeds preferably come in different levels. The level corresponds to how large an area is represented by each seed. Smaller areas are used along the transition between terrain types to retain the accuracy of the border position. Larger areas are used to reduce the required amount of data in the database when there are no transitions between terrain types.

Object Data (Object Data is different from objects. Object Data is a type of object)

Specific scenery objects, buildings, texture maps, etc.

Airport Facilities Data

Contains airport name, runaway location, altitude, navigation radios, etc. Used to provide a menu by which the user may position the aircraft to any airport and runaway by selecting the corresponding menu item. There are two layers of organization, scenery area and airport. Changing the scenery area presents a new list of airports to choose from. The list airports is used to position the user at any airport that is available within the database. The process by which the facilities data is extracted is as follows:

(1) The header information appropriate to the current World Set is read into a buffer if it has already been done by another system.

(2) The headers are scanned to see if there is any facilities data in them. This is done by looking at the Facilities_Data offset within the header. If it is null there is no Facilities Data within that file.

(3) If the offset is not null then scan through the data in the file to see if any of it is for the Current Scenery Area as selected by the user in the World-Airport menu. If there is, then display that information in the list of airport information otherwise look at the next file in the header buffer.

(4) Stop when all of the files in the header buffer have been looked at.

Library Data

A special type of scenery object. Contains all the pieces used to draw a larger entity such as a building or a tree. Used when several of the same type of object are to be displayed at once. The memory system attempts to keep one copy of the object in memory and display all the ones that are visible from a given view position by scaling and translating the single copy that is in memory.

Anchor Point Data

Data point used to convert from prior version of FLIGHT SIMULATOR database coordinate system (based on euclidian space) to the spherical coordinate system now in use, and vice versa.

Communication Radio Data

Communication radios, location, frequency, etc.

Dynamic Object Paths

A specification of the path that each dynamic object will move along. Dynamic objects are used to simulate aircraft traffic, automotive traffic, boats, etc. by moving a visual model of each craft along a fixed path.

Miscellaneous Data

OMI markers, automatic landing data, Time Zone data, etc.

Title Data

Used by the Scenery-Library menu in FLIGHT SIMULATOR to provide the user with a description of the scenery areas available.

Magnetic Variation Data

Data for correcting between true north and magnetic north.

Exceptions Data

Object identities and range identities for objects and geographic areas to be eliminated and not displayed. The object identities and range identities apply to all files and are used to clear an area of objects so new objects can be placed in the cleared area.

In order to properly understand the present improved flight simulation system, its operation will be discussed in detail for several types of objects.

VOR Objects

A VOR is a virtual instrument used for navigation. It is used to tell the compass direction of an aircraft from a stationary transmitter. This information is displayed on the screen for the user, if desired.

FIG. 1 is a flow chart which indicates how the system of the present invention processes VOR objects. Initially, when a world is selected, the headers of the scenery files which make up the world are read into memory and placed in a list (1). Next, the first entry in the header list is selected (2). The system uses the geographical information contained in that header to determine if there is an overlap between the area covered by that file and the range of view around the current aircraft position (4).

A VOR operates by being set to a particular radio frequency. Thus, if a VOR is present within the range of the aircraft, but is not at the appropriate frequency, it is of no interest to the aircraft. Furthermore, if multiple VORs are within range of the aircraft at the selected frequency, only the VOR with the strongest signal is relevant. As previously shown, the header for each file contains range of frequencies of VORs within that file. If the system determines that the selected frequency is not within the range of frequencies covered by the file (5) this means that there are no relevant VORs within this file, and the system should review the next file header (2), if others exist (3). Likewise, if there is no overlap between the area covered by the file and the range around the current aircraft position, this file is not of interest and the system shall retrieve the next file, if there are any.

If the frequency range of VORs within the file covers the selected frequency, then the file corresponding to the current entry in the header list is opened (6). As previously discussed, within each file for each object, the objects are sorted into latitude bands. From the header, the system is able to determine an offset location within the file where objects of the type being considered are located. For example, the header might indicate that VOR object data is located 2500 bytes into the file. At that offset within the file, a band set table is stored (8). Of the total number of possible frequencies of VORs, only a subset of these frequencies is generally present in a given file. The header for the file, which includes the range of frequencies of VORs contained in the file, is used to determine a relative frequency number in order to reduce the amount of data present. For example, if there are a total of 200 possible VOR frequencies, but the range of frequencies of VORs within this file is only 100, then the lowest frequency VOR within the file is used to determine a relative frequency on a scale of 0–99. This value is then used as an offset within the band set table (9) to determine if there are any VOR's of the selected frequency present within the file. Thus, the band set table includes a list of relative frequencies, and an offset into the file if a VOR at that frequency exists in this file. For example, assume that VOR frequencies range from 108.00 MHz to 117.95 MHz and that 0.05 MHz is required for each channel. Therefore, there are 200 possible VOR channels. The frequency number for a channel is calculated as follows:

Frequency #=(Frequency Setting–108.00) / 0.05

However, if a particular file contains only VOR frequencies from 109.00 MHz to 111.00 MHz, then this file need only contain information starting at 109 MHz and include channels 0–39 numbered relative to the lowest frequency (109 MHz) in that file. This reduces the amount of data needed to store all VOR objects.

Thus, the system uses the selected frequency, converts it to a relevant frequency number (Relevant Frequency#= Frequency Number—Lowest Frequency # in file), and uses it as an index into the band set table. If the entry in the band set table at this point is null (10), then there are no VORs of this frequency in the file, and the file need no longer be considered. Therefore, the file is closed (7) and if there are other files, the next file is opened. If the data field of the band set table at the point corresponding to the selected frequency is not null, this data field will be used as a relative offset into the file. This offset points to a list of latitude bands that contain only VOR'S of the selected frequency (11). At this point, the system will read the latitude band data structure (15), and begin to traverse the lat bands. For each lat band the system determines whether that lat band is within range of the current aircraft position (17). If the latitude band is not within range of the aircraft, the next latitude band will be considered until there are no further latitude bands present (18, 15, and 16). At this point, the file will be closed, and if applicable the next file will be opened. If the latitude band being considered is within range of the current aircraft position, the VOR objects in that latitude band will be considered (17 and 19). For each VOR object in that latitude band, the east-west position of the object may be analyzed to determine whether it is within the effective view of the aircraft (not shown). At this point, the system will have identified only those VOR's of the selected frequency, and within view of the aircraft.

Since each VOR has an FAA determined range, the system next computes the range from the VOR to the aircraft and determines if the aircraft is within range of the VOR (22 and 30). If not, the next VOR is considered, if any (31, 23, and 25). Otherwise, the signal strength of this VOR is computed (32), and compared to a buffer which contains the maximum signal strength of a VOR of the correct frequency and in range of the aircraft encountered so far (23). If the signal strength of the current VOR is stronger than any previously encountered (23), the identifying information and signal strength for this VOR will be stored in the buffer (24). Once this has occurred, the next VOR in this lat band will be considered until no more VORs in this lat band are within range of the aircraft (25, 20, and 21). At this point, the system will consider the next latitude band until no additional latitude bands within range of the aircraft are present. Thus, the file organization enables the system to quickly identify the strongest VOR of the selected frequency (if there is one) within view of the aircraft while actually considering only a small subset of all VOR's.

Object Data type Objects

Figure 1A:
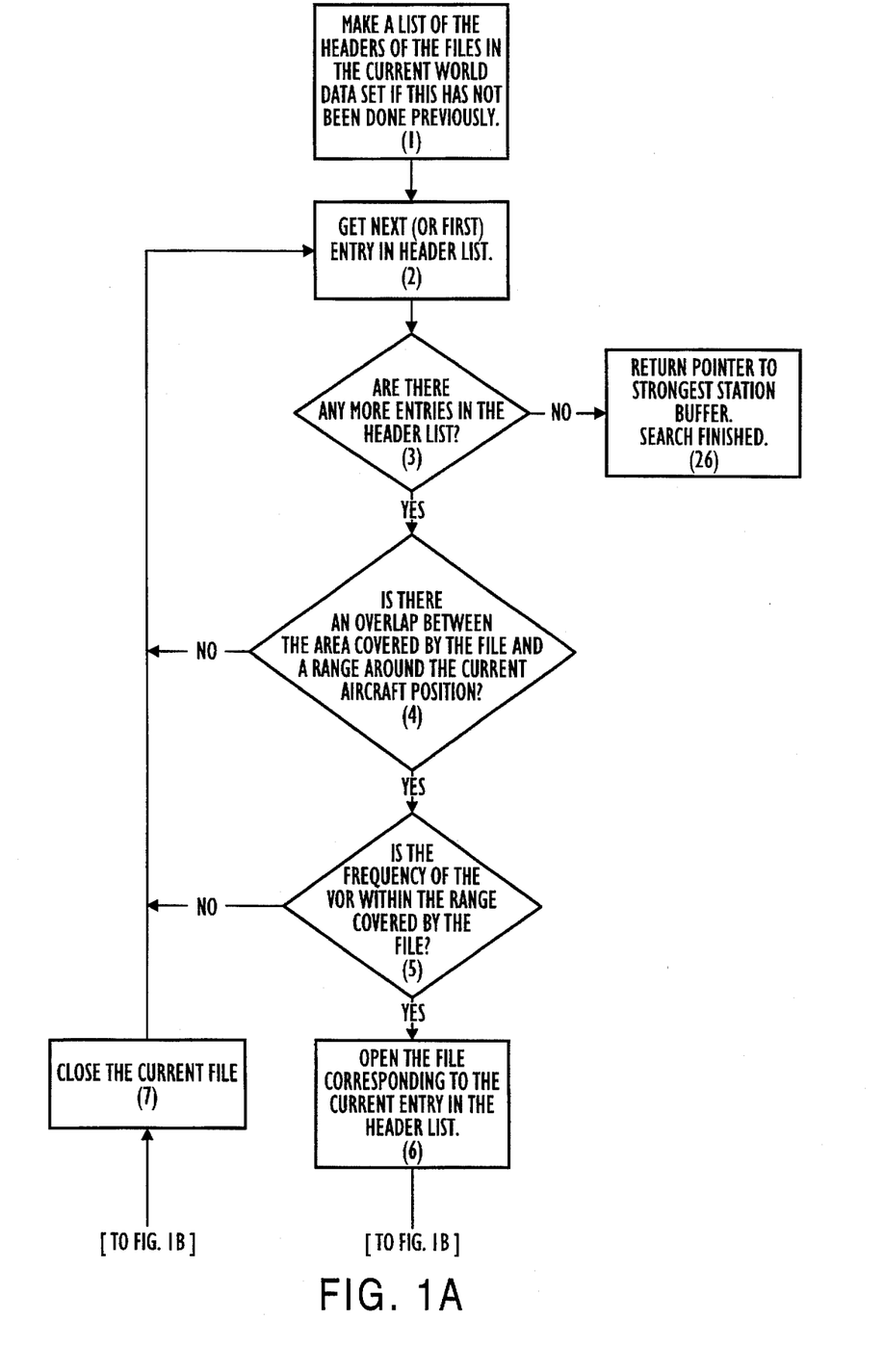
Figure 1B:
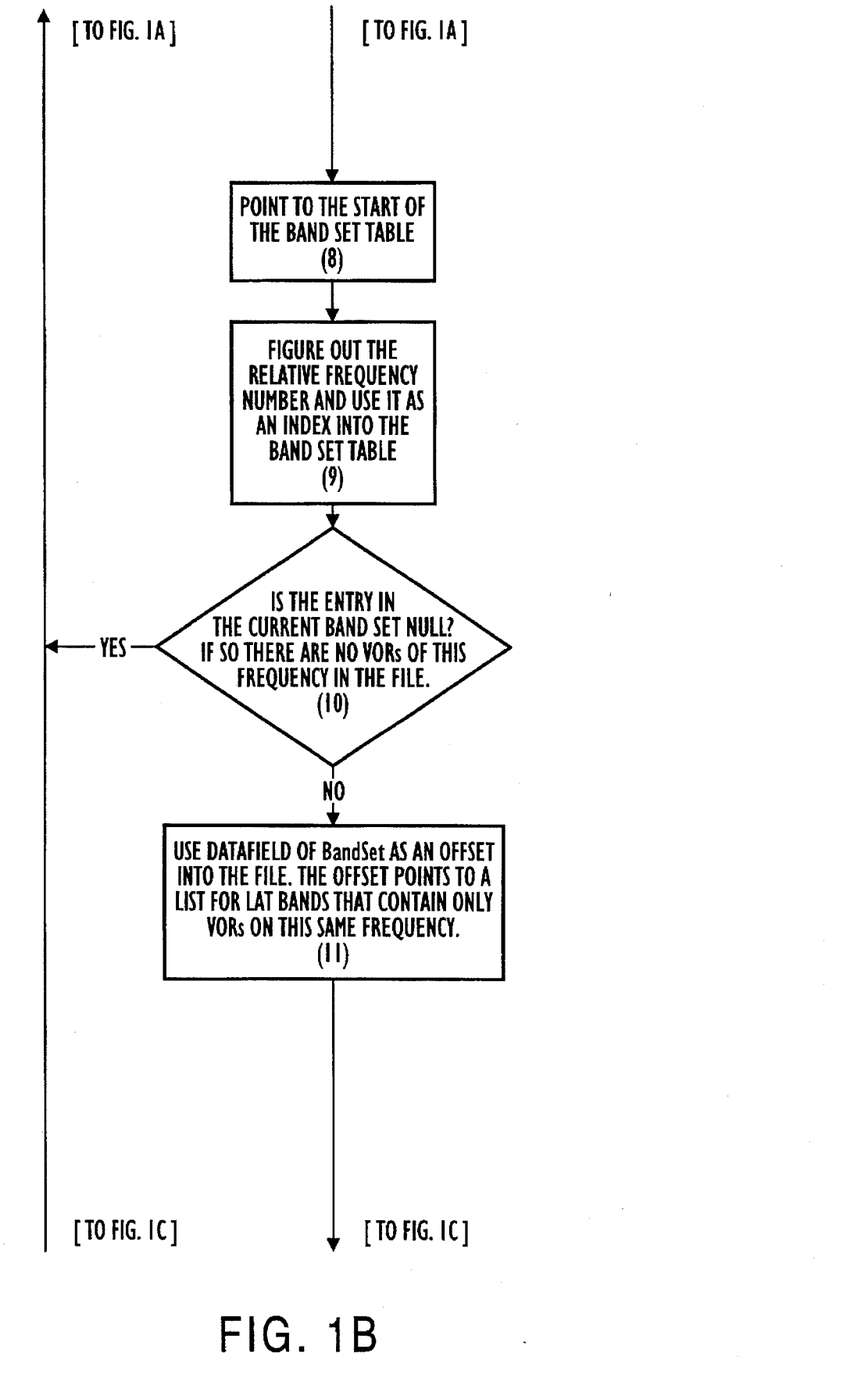
Figure 1C:
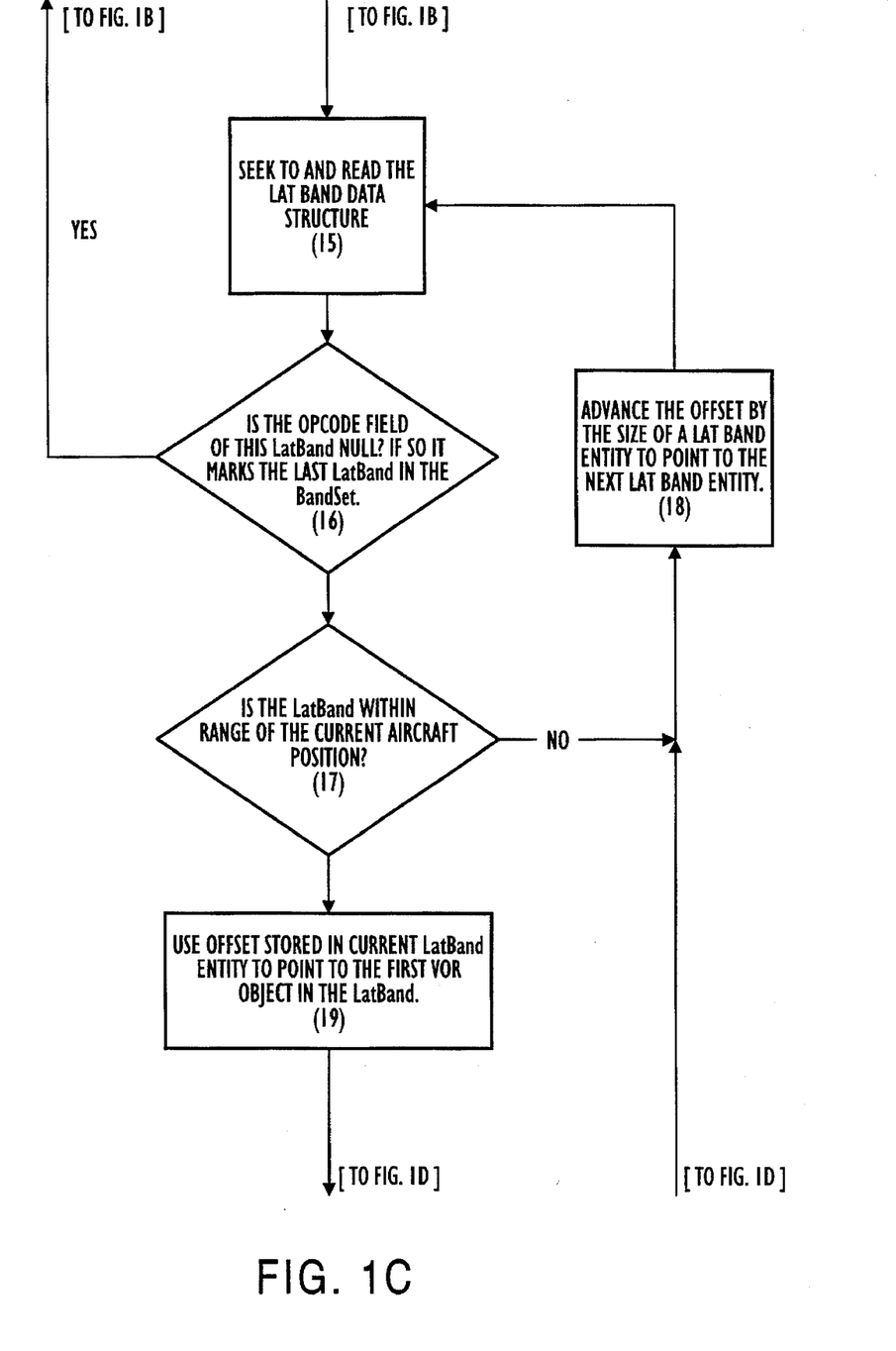
Figure 1D:
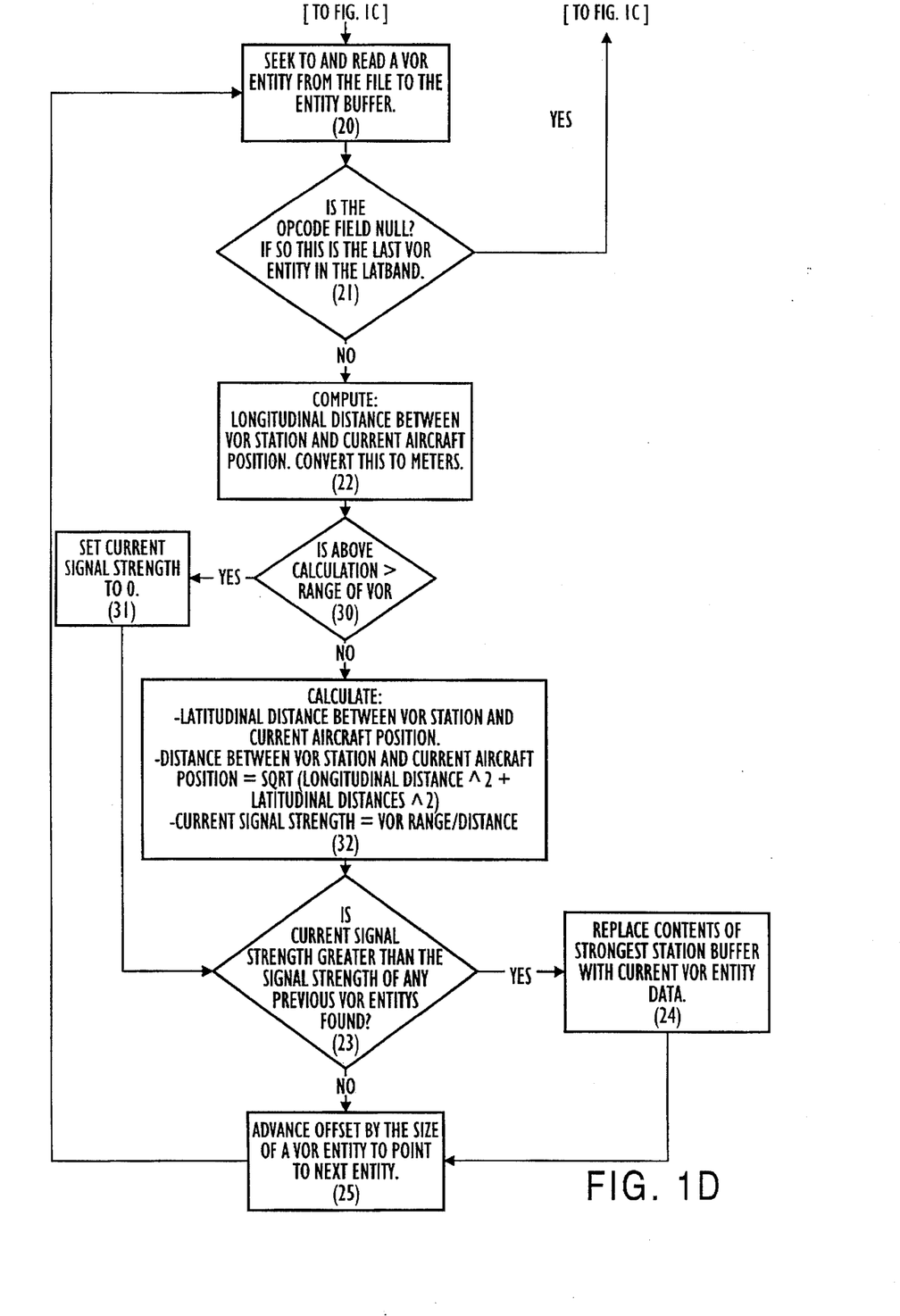
Figure 2:
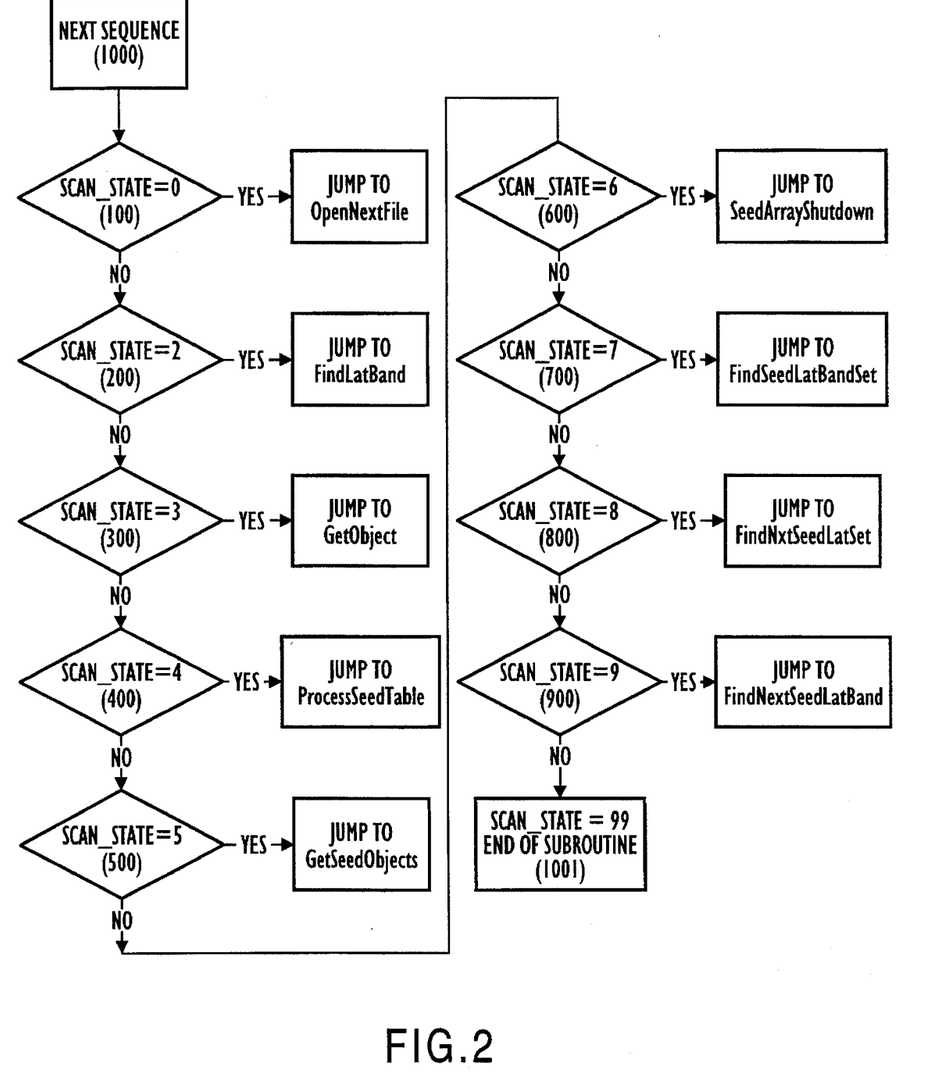
FIGS. 2–5 are block diagrams showing the processing of Object type objects in the flight simulator of the present invention.

FIGS. 2–5 provide an overview of how the present system processes Object type objects. FIG. 2 is a state table which determines what actions the system will take depending upon the state of the system (scan_state). This portion of the system includes ten scan states, with scan states 0–3 being used to process Object type objects, and scan states 4–9 used to process the seeded scenery system. Only scan states 0–3 shall be considered here.

Figure 3:
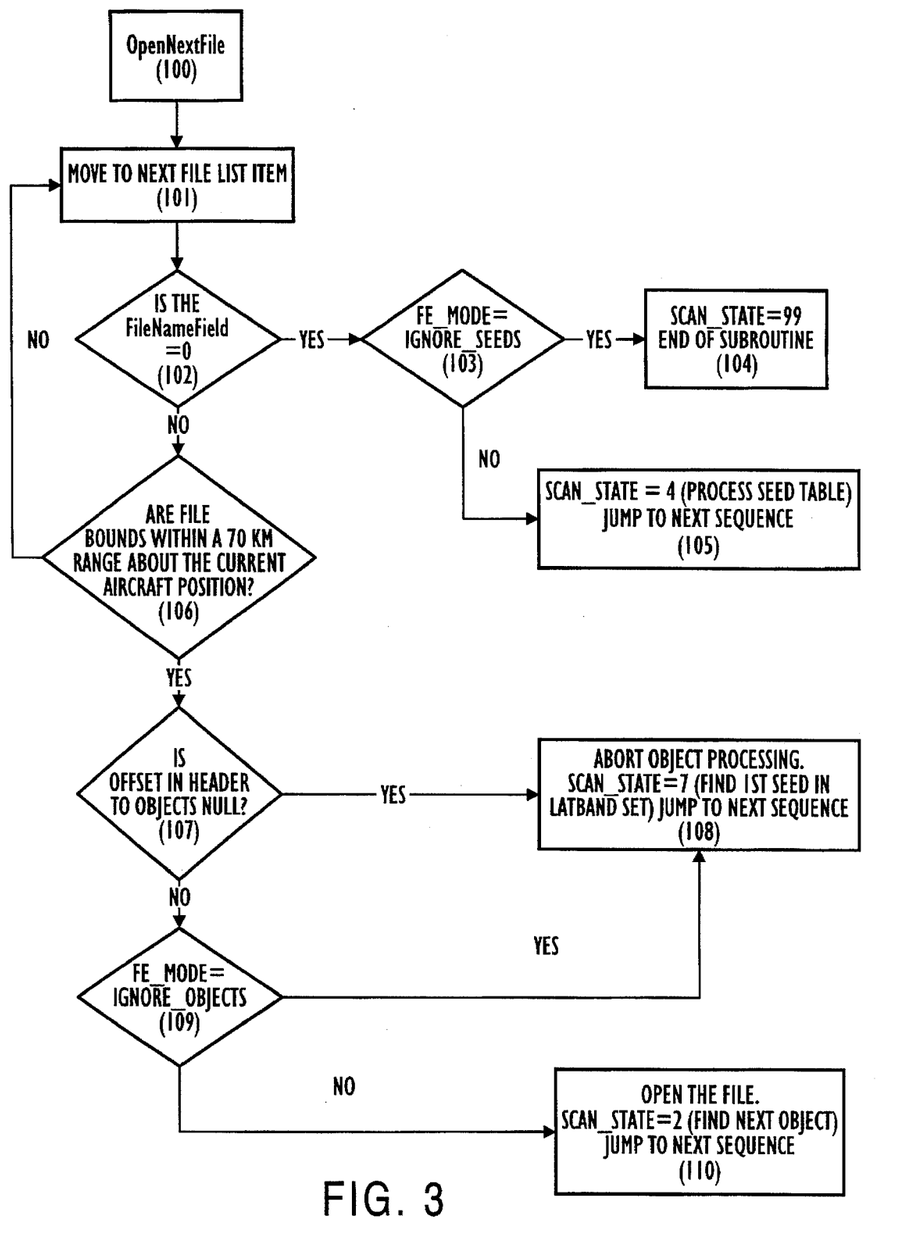

When scan_state=0 (100), it is desired to open a new scenery file to locate objects for display, as shown in FIG. 3. The first step in the processing is to identify the next file to open based upon the list of headers which represent the current world (101). If for the next file, the FileNameField=0

(102) (a parameter in the header), then all files have been considered and there are no more files to consider for Object type objects. If the system has been set to ignore seeded data (103), then this routine (for displaying seeded data and Object type objects) is completed, and may be exited (104). If seeded data is not to be ignored, then scan_state is set to 4 (105), and control is returned to the main scan state table (FIG. 2), and processing of seed data will occur. As discussed below, a seed table is built during the processing of Object type objects, and the system will now proceed to process the seed table.

If FileNameField <>0 (102), then processing of the present file continues. The system determines if the file is within view of the aircraft (106). If not, the system need not consider this file, and goes to look for others (101). If the file is within range, the system determines if the offset in the file header for Object type objects is null (107). If so, there are no objects of Object type, and Object type data processing is complete. The scan_state is now set to 7 (108) which will transfer control to a section of the system for building the seed table.

If Object type objects do exist in this file (107), then if the system was set to ignore Object type objects (109), Object type data processing is complete, and scan_state is set to 7 (108) to build the seed table. Otherwise, Object type objects are present in the file and should be processed. This file is now opened (010) (only processing of the header had been done until this point), and $scan_{13}$ state is set to 2 (for processing the lat bands of the file, see FIG. 4), and control is returned to the main state table (FIG. 3).

Figure 4:
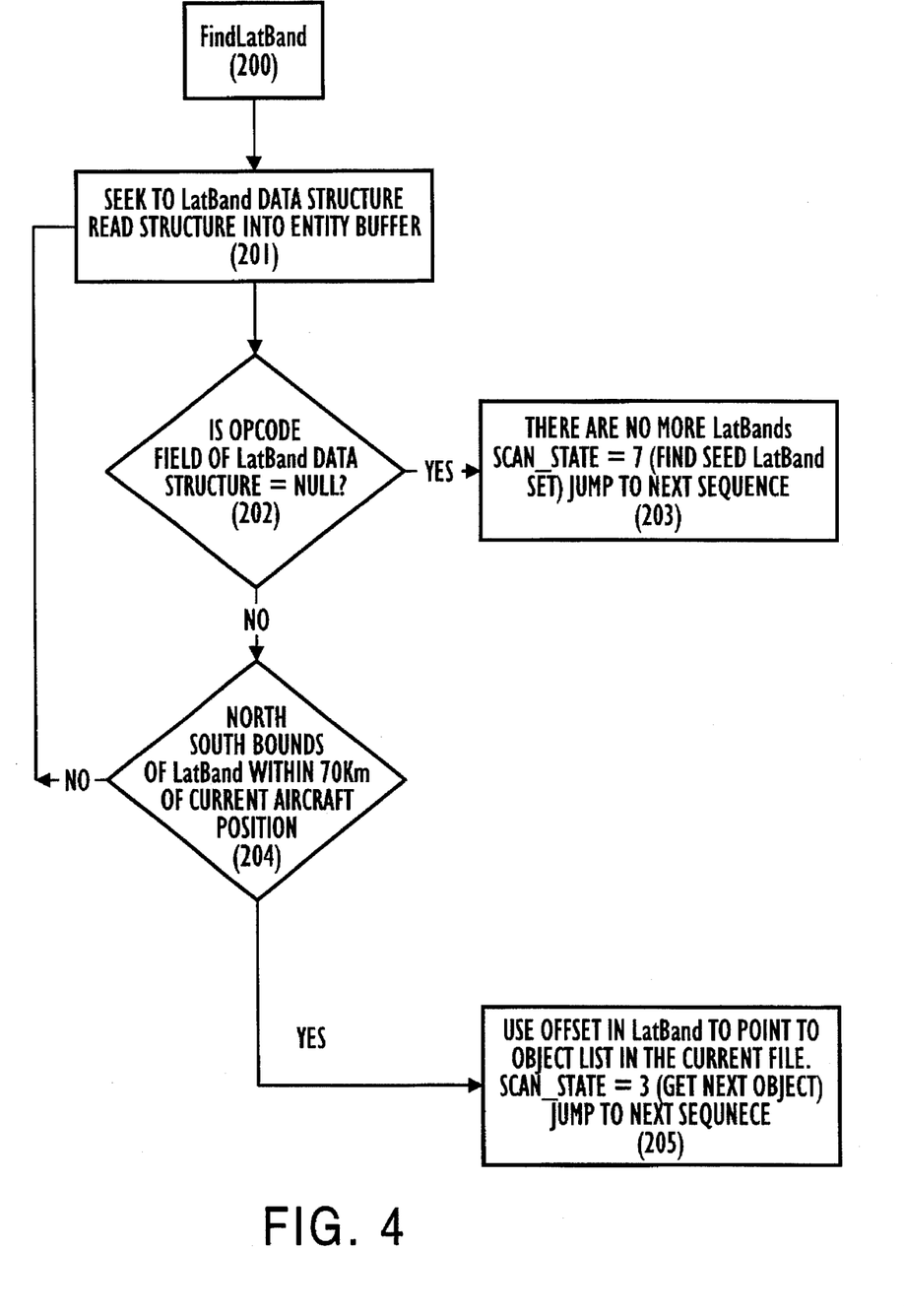

Once this has occurred, the system reads the lat band structure from the file (201). If the opcode field of the lat band data structure is null (202), then there are no more lat bands to consider. Scan_state is set to 7 for seed lat band processing to begin (203), and control is returned to the main state table. If there are remaining lat bands in the file (202), the position of the lat band is considered to determine whether it is within view of the aircraft (204). If not, the next lat band is considered (201). Otherwise, the objects of Object type in this lat band, if any, are to be considered (205), and control is returned to the main state table with scan_state set to 3.

Figure 5:
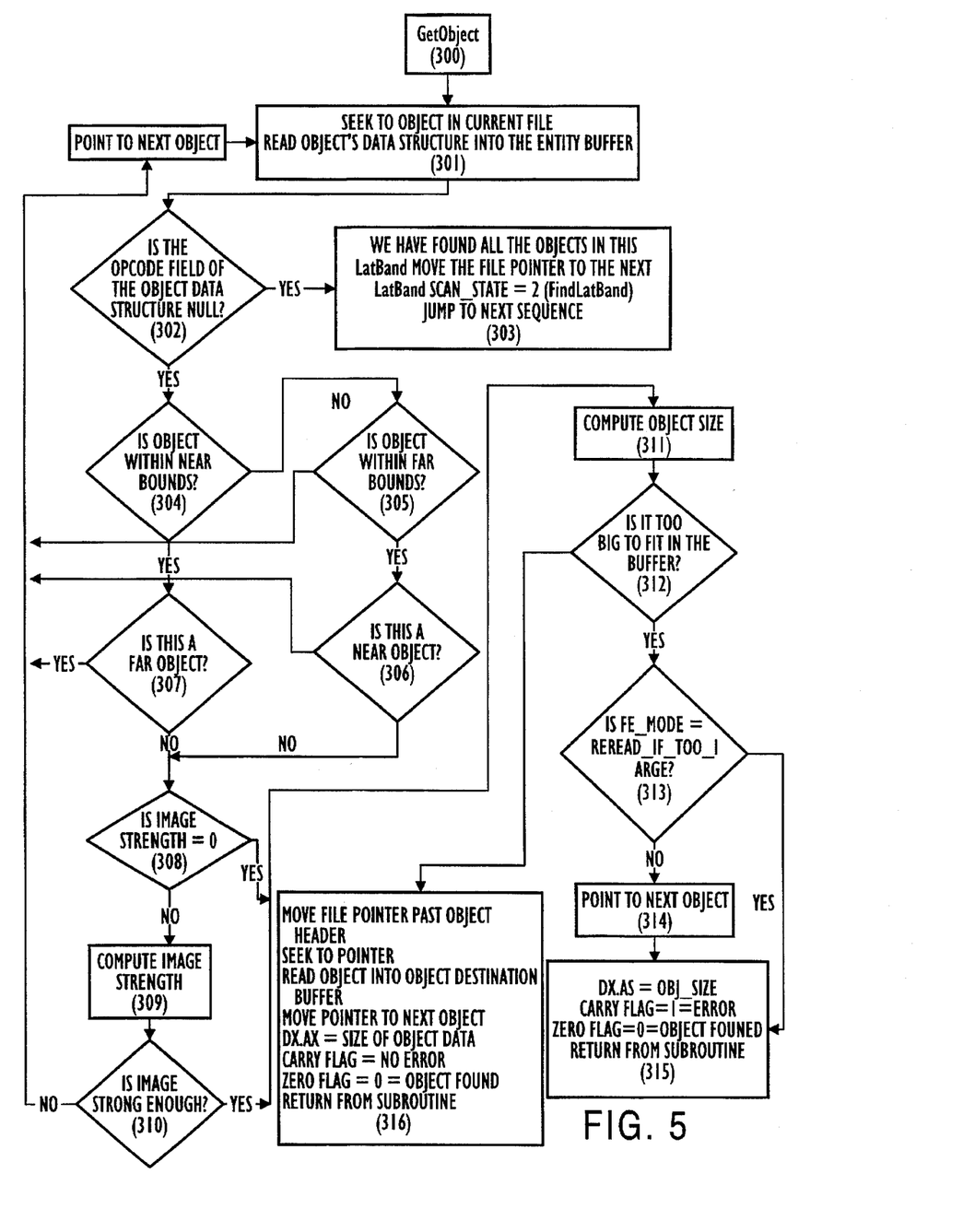
Figure 6:
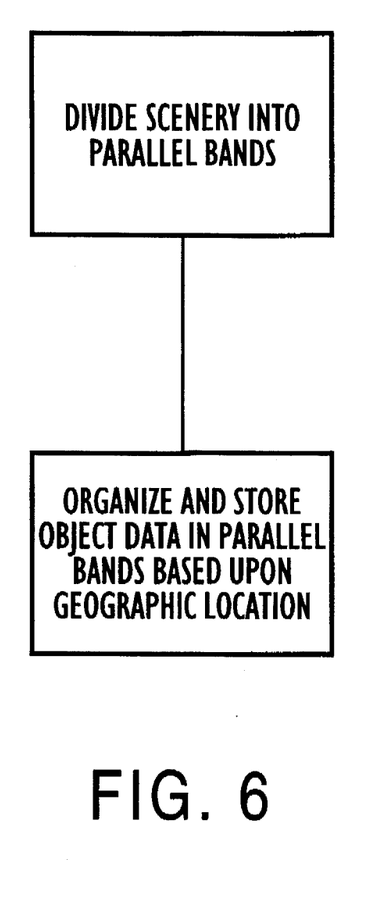
FIG. 6 is a block diagram showing organization of scenery data into parallel bands.

As shown in FIG. 5, the first object, and its data structure is read into a buffer (301). If the opcode field of the object is null (302), no more objects are present in this lat band, and scan_state is set to 2 (for consideration of the next lat band), and control is returned to the main state table (303). In the present system, objects may be defined as near or far objects, wherein far objects can only be seen if viewed from beyond a predetermined distance, and near objects may only be seen if viewed from within a certain distance. Accordingly, the system now tests these objects to determine if they are to be processed based upon object nearness and farness, and the distance to the object (near bounds or far bounds) (304–307). If the object nearness or farness does not match with the distance to the object, then the next object is considered.

Next, the image strength of the object is considered (308–310). Only if the image is strong enough (object is big enough to be seen) will it be further processed. Otherwise, the next object is considered.

The data size of the object is now considered (311). If the object size is too large to fit into the object buffer (312), the object is either ignored if this option has been selected (313) and the next object is read, or other processing is done to correct this situation (315). While not shown, the viewing distance is preferably reduced by a factor of two, until all objects in the view distance will fit into the buffer. If the object fits into the object buffer (316), the object is processed (i.e. displayed, grown into an object, or otherwise analyzed) in a separate area of the system appropriate for that object type, and then the next object is read. This process is repeated for all files, and all lat bands in each file.

The Seeded Scenery System

The Seeded Scenery System is a way to represent the surface of the earth using a database with the surface type preferably classified into one of 256 possible categories. These surfaces types were mostly derived from data sets from The U.S. Army Corps of Engineer's, CERL, GRASS Data sets. The particular data sets were titled "Primary/Cover Vegetation Types", "Land Masses", "World Topographic Elevation Ranges", and "One Percent Urbanized File". Each of the data points is referred to as a seed because the scenery display system "grows" into an appropriate visual image.

Seeds for the Seeded Scenery System are part of the Scenery Database System. There are eight different object types in the Scenery Database System dedicated to scenery seeds. These eight object types are level 8 through level 15 seeds. The level of a seed is a reference to the size or resolution of the area covered by each seed. At the equator a level 8 seed is a nearly square patch of the earth's surface 156.5429 km ($1/256$ the earths circumference at the equator) on the south, east and west edges, and 156.5496 ($1/256$ the earth's circumference at the latitude 156.5429 km North) on the north edge of the patch; a level 15 seed is a patch 1.22299 km on the south, east and west edges, and 1.22262 km on the north edge; intermediate levels differ from adjacent levels by a factor of two on each side.

The database of FLIGHT SIMULATOR includes seed data of level 8 over the entire surface of the earth, and higher level seed data (higher resolution) for selected areas. The seeded scenery system complements other scenery systems and is usually displayed only when no other scenery information is available. Other scenery objects will be displayed if they are present in the current scenery area (world) because they are always drawn after the seeds are, thus overwriting what would have been displayed by the seeded scenery system. When more than one seed is defined for the same place in the world (for instance a higher level seed is added to enhance detail in a place of particular interest) the system uses priority levels to control which gets displayed. Usually, the highest level seeds will be displayed (to get the most resolution). However, under certain circumstances, i.e. when a user zooms out, lower level seeds may be displayed. Seeds enable the entire surface of the world, in varying resolutions, to be stored and displayed with a limited amount of data.

The following seed types are preferably available:

| PRIMARY LAND COVER: | |
|---|---|
| 64 kilometer seed textures | 16 kilometer seed textures: |
| $00 = water | $80 = |
| $01 = broadleaf | $81 = small city |
| $02 = needleleaf | $82 = medium city |
| $03 = tropical | $83 = suburban 1 |
| $04 = crops | $84 = lake |
| $05 = prairie | $85 = suburban 2 |
| $06 = arid | $86 = suburban 3 |
| $07 = desert | $87 = |
| $08 = tundra | $88 = rolling hills |
| $09 = ice | $89 = sand dunes |
| $0A = swamp | $8A = hi rise |
| | $8B = med rise |

-continued

| PRIMARY LAND COVER: | |
|---|---|
| 64 kilometer seed textures | 16 kilometer seed textures: |
| | $8C = urban |
| | $8D = urb/sub |

As can be seen from the foregoing, the system of the present invention enables a complex world to be developed with a minimum of data. Through the novel method of organizing the world data, the system is able to quickly and efficiently obtain the information needed to display the world, while considering very little extraneous information. This enables more realistic performance of the flight simulation system.

Overlay System

The improved version of FLIGHT SIMULATOR being described herein preferably employs a dynamic overlay management system to manage the use of memory. In MS-DOS operating system based programs, overlays are a means of controlling an area of memory known as conventional memory. Conventional memory is the default place for a program to load and run when invoked through the DOS operating system. For historical reasons the size of conventional memory is limited to 640K bytes. In modern applications with modern processors this is not enough memory. Many means of working around this limit have evolved over the years and overlays are just one of them. The present system uses overlays as well as extended and expanded memory to improve memory management.

Overlays work by dividing a program up into fragments and loading only the currently active portion of the program into memory. When an active portion is finished running then another fragment may be loaded into the same memory thus overlaying the previous fragment. In practice, a program is often broken up into many fragments each small compared to the 640K limit of conventional memory. When this is done, fragments which are run often or that need to be run during time critical portions of the program are kept in memory longer and are overlaid only when there is no other way to get the memory required to run the program. Smaller overlays have an additional benefit of requiring less time to load and therefore tend no to disrupt the users sense of continuity as much as the delay caused by loading a large overlay. DOS has no standard mechanism for implementing these strategies but does provide a load overlay service. The present system provides a novel overlay mechanism which reduces the overhead of the overlay management system, and consequently improves the performance of the system.

Typically, when a routine in called, the overlay manager determines which file contains this routine, and loads this file into memory. Each time a routine is called, the overlay manager determines whether it (or the file that contains it) is already in memory, and directs the system to run this routine, or to load the routine and then run it.

In the present invention, after the improved version of FLIGHT SIMULATOR has been assembled and linked, a dynamic overlay table is generated and included in the overlay manager file which is invoked when a routine is called. This table contains a list of addresses, one for each line of code which calls a routine which must be loaded by the overlay manager. For each address, the list contains a reference to the routine which is being called by the code at that address. For example, if a line of code at address 10000 calls routine X, then the dynamic overlay table will include a reference which indicates that a call received from address 10000 is in fact a call to routine X. In fact, during the linking process, the call to X will be rewritten as a call to the overlay manager.

When line 10000 is executed, a call to the overlay manager occurs. The call instruction to the overlay manager automatically pushes the address "10000+1" onto the stack. When the overlay manager takes control, it retrieves the address (it pops the stack) of the calling line, i.e. line 10000, and uses the dynamic overlay table to determine that the call received from line 10000 is actually a call to X. The overlay manager then determines which file contains routine X, and loads that file into memory. Finally, the overlay manager takes the address of X in memory, and rewrites the line of code at 10000 to be a subroutine call command directly to the location of X in memory. Using this novel system, the overlay manager modifies the code of the system to eliminate calls to the overlay manager. As long as X is still in memory, calls to X from line 10000 proceed without using the overlay manager and thereby improve the efficiency of the system.

If the overlay manager determines that routine X should be removed from memory (i.e. to make room in memory for other fragments of the system), before doing so, it rewrites line 10000 to be a call to the overlay manager as it had been previously. Thus, the present overlay manager dynamically rewrites the system code to allow for zero system overhead once a routine has been loaded by the overlay manager.

Presently, the overlay management system determines when a file containing routines should be removed from memory based upon a counting system. Each overlay file when loaded initiates a counter with a preset starting value. At fixed time intervals, i.e. every 100 milliseconds, the counter is decreased. When a routine in that overlay file is called, the counter is reinitialized to the preset starting value. If the counter goes to zero, the file is removed from memory. The counter may also be used to determine which file to remove from memory if additional memory is needed by the overlay manager for other files since the file with the lowest count is probably least used.

Although the present invention has been described with respect to a flight simulation system, the concepts disclosed herein are readily applicable to other applications in which it is desired to simulate scenery, such as in mapping, terrain following, or other simulation or other applications. Furthermore, the novel overlay manager disclosed herein is applicable in many situations in which an overlay manager is used. Therefore, it is foreseen that other applications exist which are within the scope of the present invention as defined in the following claims.

What is claimed is as follows:

1. A method of organizing and storing scenery data of simulated scenery in a flight simulation system for providing improved flight simulation in an environment comprising the simulated scenery, the scenery having geographic boundaries and comprising scenery objects of a plurality of types, each of the scenery object types comprising object data for being read by the flight simulation system, the flight simulation system comprising processing means for reading the object data and simulating and processing an object of the object type for each of the object types; the method comprising:

dividing the scenery data into a plurality of geographically parallel bands, each parallel band having geographic boundaries and objects geographically located in the geographic boundaries for each parallel band; and organizing and storing the object data for the objects in each of the parallel bands based upon the geographic location of the object in the parallel band for enabling the flight simulation system to independently access the object data in each parallel band for processing the object data for the objects located therein, and for enabling the flight simulation system to process each object in the parallel band based upon the geographic location of the object in the parallel band.

2. The method according to claim 1 wherein the step of organizing and sorting the object data comprises the steps of first sorting the objects by the object type of the object; and organizing the object data for objects of each object type based upon the geographic location of each object and storing the object data in the parallel bands for enabling the flight simulation system to independently access the object data for each object type in each parallel band and for processing the object data for objects of that type located therein based upon the geographic location of each object.

3. The method according to claim 2 further comprising the steps of:

the flight simulation system determining a position of an aircraft in the scenery;

traversing the parallel bands of object data for each object type, and identifying the parallel bands that are within a predetermined distance of the aircraft; and processing the object data in each parallel band within the predetermined distance of the aircraft according to the object type associated with the parallel bands.

4. The method according to claim 3 further comprising the steps of:

traversing the objects in each parallel band that is within the predetermined distance of the aircraft and determining which of the objects are within the predetermined distance of the aircraft; and processing the object data for each object within the predetermined distance according to the object type of the object.

5. The method according to claim 4 wherein the object data comprises position data for the object, and the step of determining if the object is within the predetermined distance of the aircraft comprises the step of calculating the distance from the position of the aircraft to the position of the object and determining if this distance is less than the predetermined distance.

6. The method according to claim 2 wherein each of the parallel bands is oriented parallel to a geographic latitude of the scenery.

7. The method according to claim 6 wherein the objects of each object type are sorted and stored in the parallel bands from west to east.

8. The method according to claim 2 wherein the objects of each object type are sorted and stored in the parallel bands from west to east.

9. The method according to claim 2 wherein the scenery is stored in a plurality of scenery files, each of the scenery files having geographic boundaries, the geographic boundaries of the scenery files combining to form the geographic boundary of the scenery, the object data for each object type in each scenery file being organized into the parallel bands; and further comprising the steps of:

determining which of the scenery files are within a predetermined distance of the aircraft; and traversing the parallel bands of the scenery files within the predetermined distance by the object type for identifying and processing objects of the object type within the scenery files that are within the predetermined distance.

10. The method according to claim 9 further comprising the step of storing a header on each of the scenery files, the header for each particular scenery file comprising the geographic limits of the particular scenery file, and a file identifier.

11. The method according to claim 10 wherein the header further comprises an object type offset into the scenery file for each object type for locating the object data for objects of that object type in the scenery file.

12. The method according to claim 2 further comprising the step of storing a header comprising the geographic limits of the scenery and an object type offset for each object type for locating the object data for objects of that object type.

13. The method according to claim 1 further comprising the steps of:

determining a position of an aircraft in the flight simulation system;

traversing the parallel bands and determining the parallel bands that are within a predetermined distance of the aircraft; and processing the object data in the parallel bands that are within the predetermined distance.

14. The method according to claim 13 further comprising the steps of:

traversing the objects in each parallel band that is within the predetermined distance of the aircraft and determining which of the objects are within the predetermined distance of the aircraft; and processing the object data for each object within the predetermined distance according to the object type of the object.

15. The method according to claim 14 wherein the object data comprises position data for the object, and the step of determining if the object is within the predetermined distance of the aircraft comprises the step of calculating the distance from the position of the aircraft to the position of the object and determining if this distance is less than the predetermined distance.

16. The method according to claim 1 wherein each of the parallel bands is oriented parallel to a geographic latitude of the scenery.

17. The method according to claim 1 wherein the scenery is stored in a plurality of scenery files, each of the scenery files having geographic boundaries, the geographic boundaries of the scenery files combining to form the geographic boundary of the scenery, the object data for each scenery file being organized into the parallel bands; and further comprising the steps of:

determining which of the scenery files are within a predetermined distance of the aircraft; and traversing the parallel bands of the scenery files within the predetermined distance for identifying and processing objects within the scenery files that are within the predetermined distance.

18. The method according to claim 17 further comprising the step of storing a header on each of the scenery files, the header for each particular scenery file comprising the geographic limits of the particular scenery file, and a file identifier.

19. The method according to claim 1 wherein the scenery object types are selected from the group consisting of VOR Radio Data, Automatic Direction Finder Data, Synthesized Scenery Seeds, Object Data, Airport Facilities Data, Library Data, Anchor Point Data, Communication Radio Data, Dynamic object Paths, Miscellaneous Data, Title Data, Magnetic Variation Data, and Exceptions Data.

20. The method according to claim 19 wherein each of the objects is selected from the group consisting of near objects and far objects.

21. A method of organizing and storing simulated scenery, the scenery having geographic boundaries and comprising scenery objects of a plurality of types, each of the scenery object types comprising object data for simulating the object in conjunction with processing means for reading the object data and simulating and processing an object of the object type for each of the object types; the method comprising:

dividing the scenery into a plurality of parallel bands each parallel band having geographic boundaries and objects geographically located in the geographic boundaries for each parallel band; and organizing and storing the object data for the objects in each of the parallel bands based upon the geographic location of the object in the parallel band for enabling the processing means to independently access the object data in each parallel band for processing the object data for the objects located therein, and for enabling the processing means to process each object in the parallel band based upon the geographic location of the object in the parallel band.

22. The method according to claim 21 wherein the step of organizing and sorting the object data comprises the steps of sorting the objects by the object type of the object; and organizing the object data for objects of each object type based upon the geographic location of each object and storing the object data in the parallel bands for enabling the processing means to independently access the data for each object type in each parallel band for processing the object data for objects of that type located therein based upon the geographic location of each object.

23. The method according to claim 22 wherein each of the parallel bands is oriented parallel to a geographic latitude of the scenery.

24. The method according to claim 23 wherein the objects of each object type are sorted and stored in the parallel bands from west to east.

25. The method according to claim 22 wherein the objects of each object type are sorted and stored in the parallel bands from west to east.

26. The method according to claim 22 wherein the scenery is stored in a plurality of scenery files, each of the scenery files having geographic boundaries, the geographic boundaries of the scenery files combining to form the geographic boundary of the scenery, the object data for each object type in each scenery file being organized into the parallel bands; and further comprising the steps of:

traversing the parallel bands of the scenery files by the object type for identifying and processing objects of the object type.

27. The method according to claim 26 further comprising the step of storing a header comprising the geographic limits of the scenery and an object type offset for each object type for locating the object data for objects of that object type.

28. The method according to claim 21 wherein each of the parallel bands is oriented parallel to a geographic latitude of the scenery.

29. The method according to claim 21 wherein the object data comprises position data for the object.

30. The method according to claim 21 wherein the scenery is stored in a plurality of scenery files, each of the scenery files having geographic boundaries, the geographic boundaries of the scenery files combining to form the geographic boundary of the scenery, the object data for each scenery file being organized into the parallel bands; and further comprising the step of:

traversing the parallel bands of each of the scenery filed for identifying and processing objects within the scenery files.

31. The method according to claim 30 further comprising the step of storing a header on each of the scenery files, the header for each particular scenery file comprising the geographic limits of the particular scenery file, and a file identifier.

32. The method according to claim 31 wherein the header further comprises an object type offset into the scenery file for each object type for locating the object data for objects of that object type in the scenery file.

* * * * *